United States Patent
Baldo et al.

(10) Patent No.: US 7,319,791 B1
(45) Date of Patent: Jan. 15, 2008

(54) SUBTRACTIVE PRIMITIVES USED IN PATTERN MATCHING

(75) Inventors: Stephane Baldo, Montreal (CA); Djamel Yahia Meddah, Saint-Laurent (CA)

(73) Assignee: Matrox Electronic Systems, Ltd., Dorval (CA)

( * ) Notice: Subject to any disclaimer, the term of this patent is extended or adjusted under 35 U.S.C. 154(b) by 69 days.

(21) Appl. No.: 11/065,960

(22) Filed: Feb. 25, 2005

Related U.S. Application Data

(63) Continuation-in-part of application No. 10/666,243, filed on Sep. 22, 2003, now abandoned.

(51) Int. Cl.
*G06K 9/68* (2006.01)

(52) U.S. Cl. .................................... 382/219; 382/220

(58) Field of Classification Search ................ 382/103, 382/130, 170, 181, 217, 218, 219, 220, 221, 382/224
See application file for complete search history.

(56) References Cited

U.S. PATENT DOCUMENTS

| | | | | |
|---|---|---|---|---|
| 5,123,057 A | * | 6/1992 | Verly et al. | 382/156 |
| 5,802,204 A | * | 9/1998 | Basehore | 382/186 |
| 5,915,250 A | * | 6/1999 | Jain et al. | 707/100 |
| 6,084,595 A | * | 7/2000 | Bach et al. | 345/589 |
| 6,621,941 B1 | * | 9/2003 | Syeda-Mahmood et al. | 382/306 |
| 6,639,624 B1 | | 10/2003 | Bachelder et al. | |
| 2002/0181780 A1 | | 12/2002 | Simon et al. | |

OTHER PUBLICATIONS

Yaron C. Hecker and Ruud M. Bolle, On Geometric Hashing and the Generalized Hough Transform, IEEE Transactions on Systems, Man, and Cybernetics, Sep. 1994, pp. 1328-1338, vol. 24, No. 9.

* cited by examiner

*Primary Examiner*—Brian Le
(74) *Attorney, Agent, or Firm*—Lowrie, Lando & Anastasi, LLP

(57) ABSTRACT

A method for recognizing an object in a target image using model primitives comprising an additive primitive and a subtractive primitive; weights are assigned to the additive and subtractive primitives; a target primitive is derived for the object; associations are determined between the target primitive and the model primitives; a similarity score is computed for the target primitive with respect to the model primitives; the similarity score is increased for each association between the target primitive and the additive primitive and decreased for each association between the target primitive and the subtractive primitive; the weights determine an amount by which the similarity score is increased or decreased for each of the associations.

26 Claims, 16 Drawing Sheets

Scale: 1

Scale: 1

SUBTRACTIVE PRIMITIVES USED IN PATTERN MATCHING

RELATED APPLICATIONS

This application is a continuation in part of U.S. application Ser. No. 10/666,243, entitled "SUBTRACTIVE PRIMITIVES USED IN PATTERN MATCHING," filed on Sep. 22, 2003 now abandoned, which is herein incorporated by reference in its entirety.

BACKGROUND OF INVENTION

1. Field of Invention

This invention relates to the field of machine vision and more precisely to pattern matching.

2. Discussion of Related Art

When using present pattern matching techniques, there are situations where it is possible to incorrectly select a match for a model in a target image among a set of occurrences. Examples of such situations are illustrated below.

FIGS. 3a, 1a, 1b and 1c together illustrate an example where more than one occurrence of a model is detected in a target image when using prior art techniques. Referring to FIG. 3a, the model is defined by a set of primitives 16, as in methods known in the art. For the purposes of this description, the foregoing primitives will be referred to herein as additive primitives. The dotted lines around the model primitives 16 are illustrative only and indicate that a blank space to the left of the model primitives 16 is being sought. However, this blank space is not defined in the model.

In the target image, the likelihood of a match at a given location is measured using a similarity score, which computes the proportion of model primitives appearing at this location. In the situation illustrated in FIGS. 1a, 1b and 1c, the three located occurrences 12, 18 and 24 yield identical similarity scores of 100%.

The skilled addressee will appreciate the limitations of this prior art technique in the case where a particular occurrence of the model is sought; in the present example, an occurrence neighbored on the left by a blank space is desired and this condition is satisfied only by occurrence 12 in the illustrated target image. This is a serious drawback for many applications.

FIGS. 3b, 2a, 2b and 2c together illustrate another example where more than one occurrence of a model is detected in a target image when using prior art techniques. Referring to FIG. 3b, the new model is defined as previously by a set of additive primitives 28. The dotted lines around the model primitives 28 are illustrative only and indicate that a blank space to the right of the model primitives 28 is sought; again, this wish is not defined in the model.

In the situation illustrated in FIGS. 2a, 2b and 2c, three occurrences 32, 36 and 40 of the model are located in the target image with the similarity scores shown. In FIG. 2a, a similarity score of, for example, 100% is computed. In FIGS. 2b and 2c, occurrences 36 and 40 produce identical scores of, for example, 85% since the vertical edge of the model is missing in occurrences 36 and 40.

The skilled addressee will appreciate that, if a threshold of say 70% is used for a positive match, all three occurrences 32, 36 and 40 would be considered matches for the model, while only occurrence 32 satisfies the above-identified wish. It will be appreciated that this is a serious disadvantage.

There is therefore a need in the industry for a method that will overcome the above-identified drawbacks.

SUMMARY OF INVENTION

It is an object of the invention to provide a method for recognizing an object in a target image using a model defined by additive and subtractive model primitives.

According to a first aspect of the invention, there is provided a method for recognizing an object in a target image using model primitives comprising additive and subtractive primitives. The method comprises assigning weights to the additive and subtractive primitives and deriving a target primitive for the object. The method also comprises determining associations between the target primitive and the model primitives. Finally, the method comprises computing a similarity score for the target primitive with respect to the model primitives, by increasing the similarity score for each one of the associations between the target primitive and the additive primitive, and by decreasing the similarity score for each one of the associations between the target primitive and the subtractive primitive, wherein the weights determine an amount by which the similarity score is increased or decreased for each of said associations.

According to another aspect of the invention, there is provided a computer-readable storage medium on which are stored instructions to be executed by a processing unit to carry out the foregoing method of object recognition.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
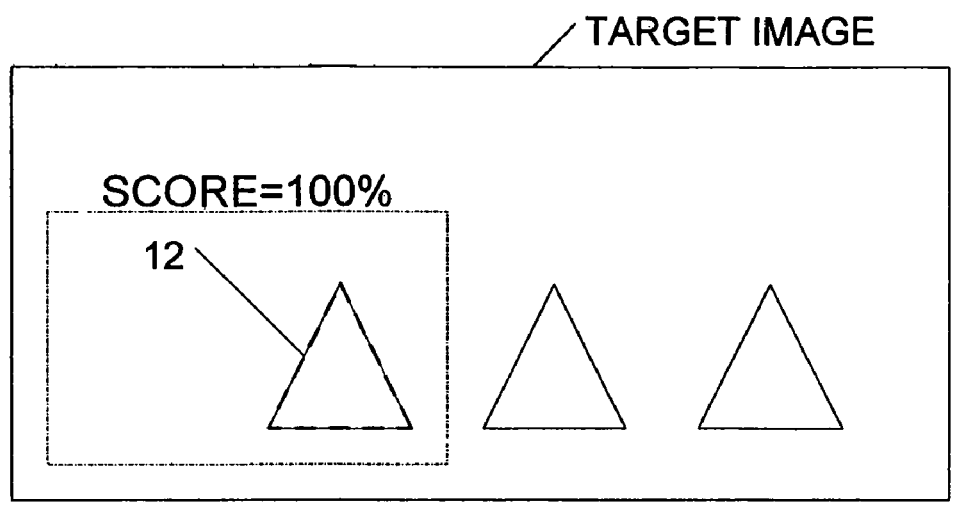
FIGS. 1a, 1b and 1c are schematics showing an example where more than one occurrence of a model is detected in a target image when using prior art techniques.
Figure 1B:
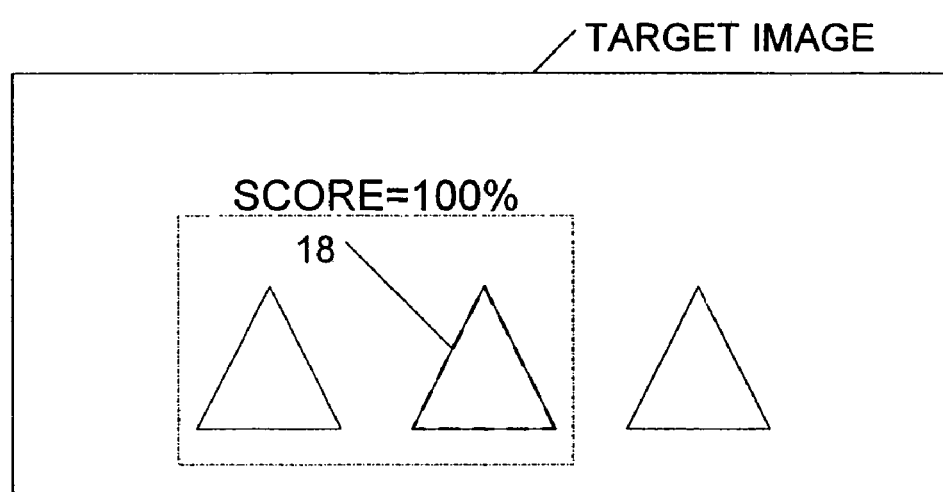
Figure 1C:
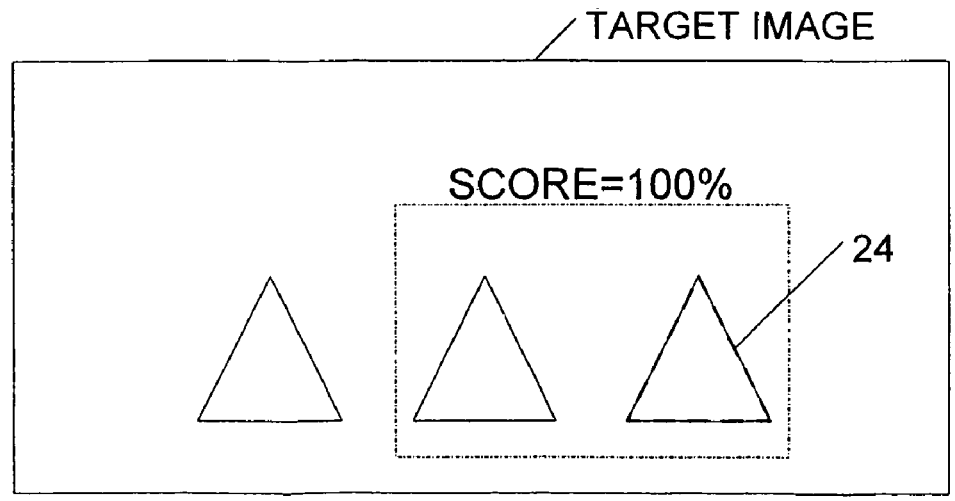
Figure 2A:
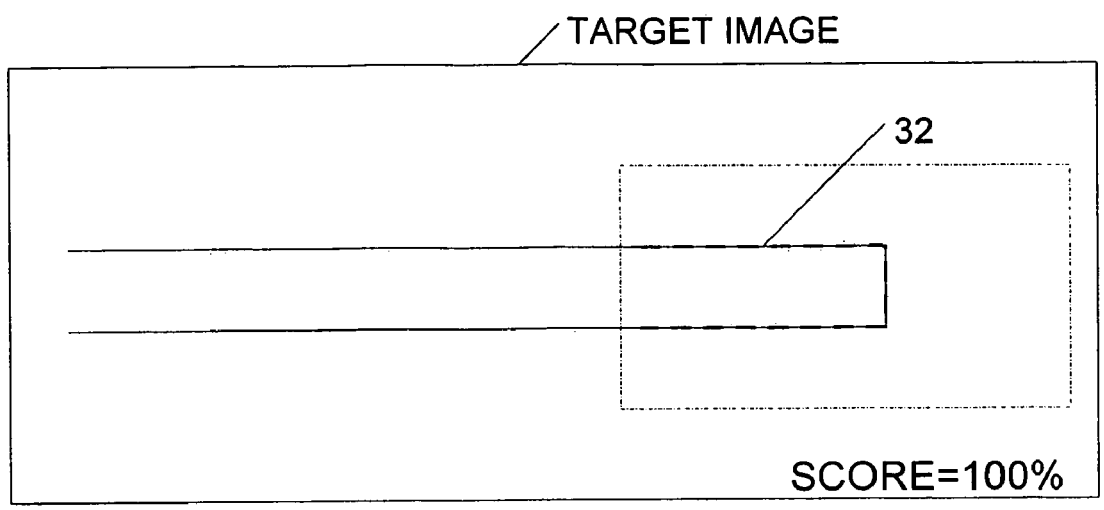
FIGS. 2a, 2b and 2c are schematics showing another example where more than one occurrence of a model is detected in a target image when using prior art techniques.
Figure 2B:
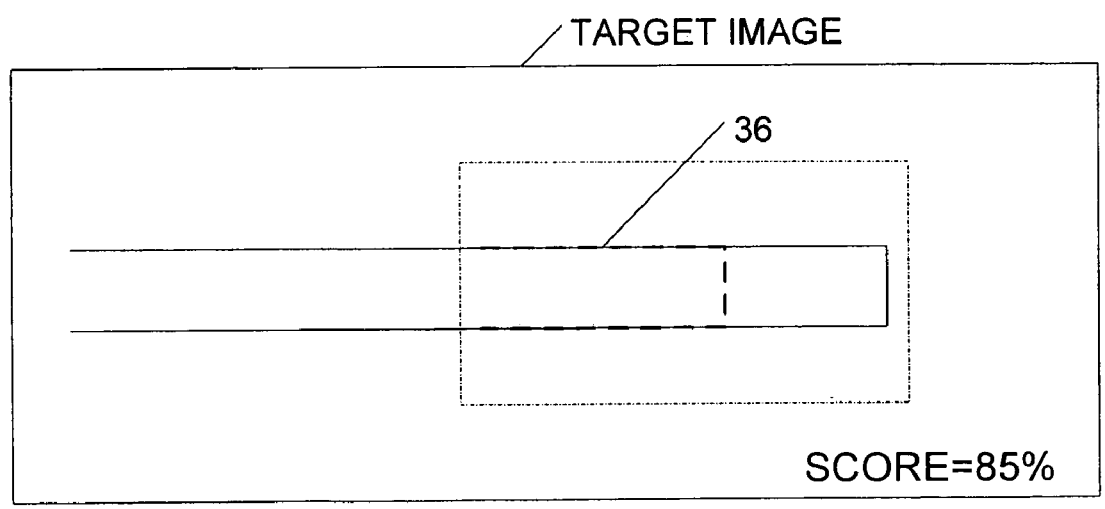
Figure 2C:
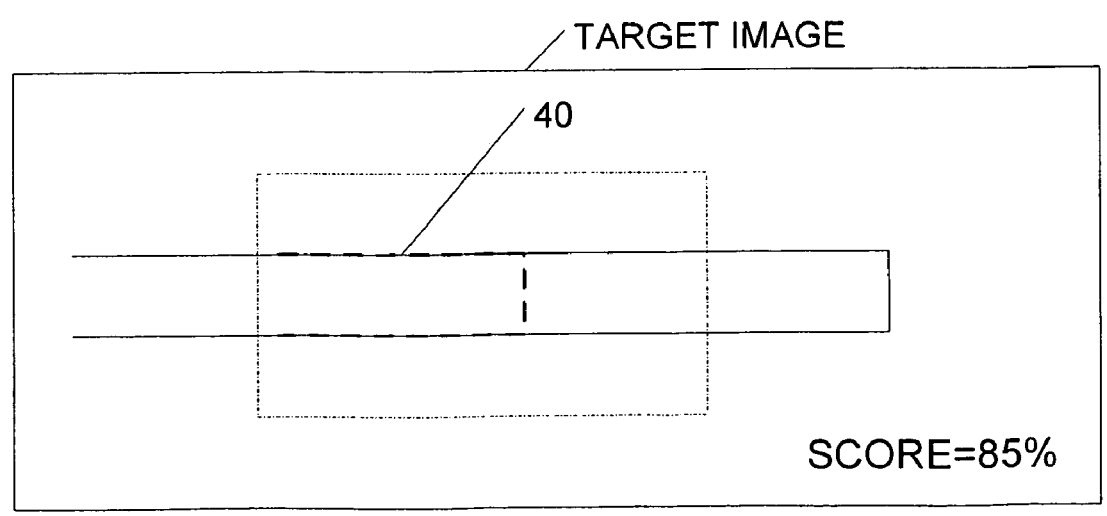
Figure 3A:
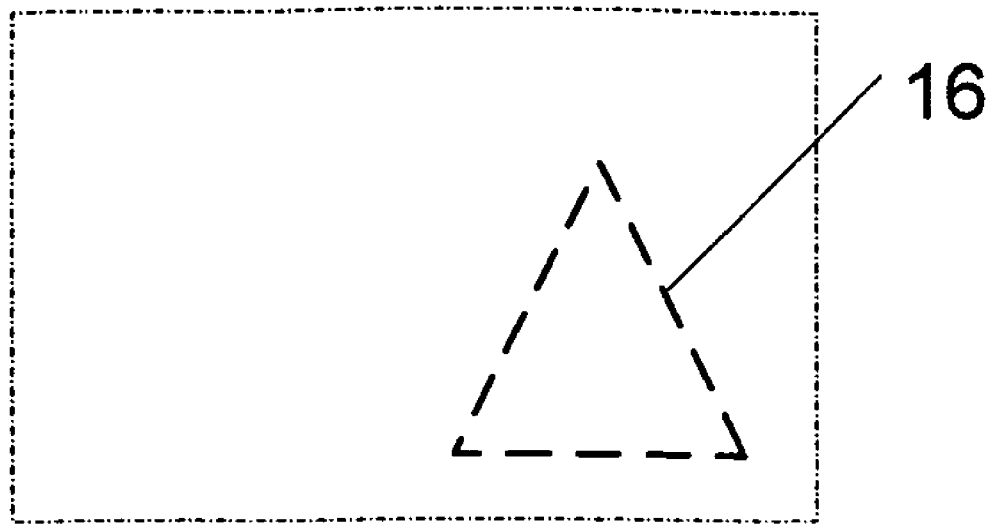
FIGS. 3a and 3b are schematics showing the models for the examples illustrated in FIGS. 1a, 1b, and 1c and FIGS. 2a, 2b, and 2c respectively.
Figure 3B:
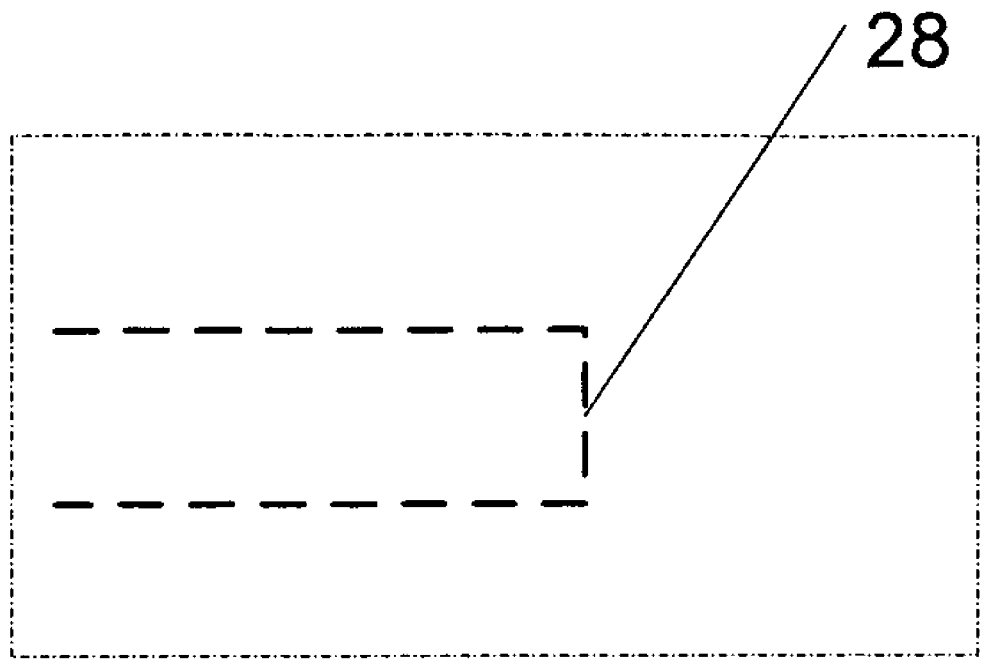

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 4:
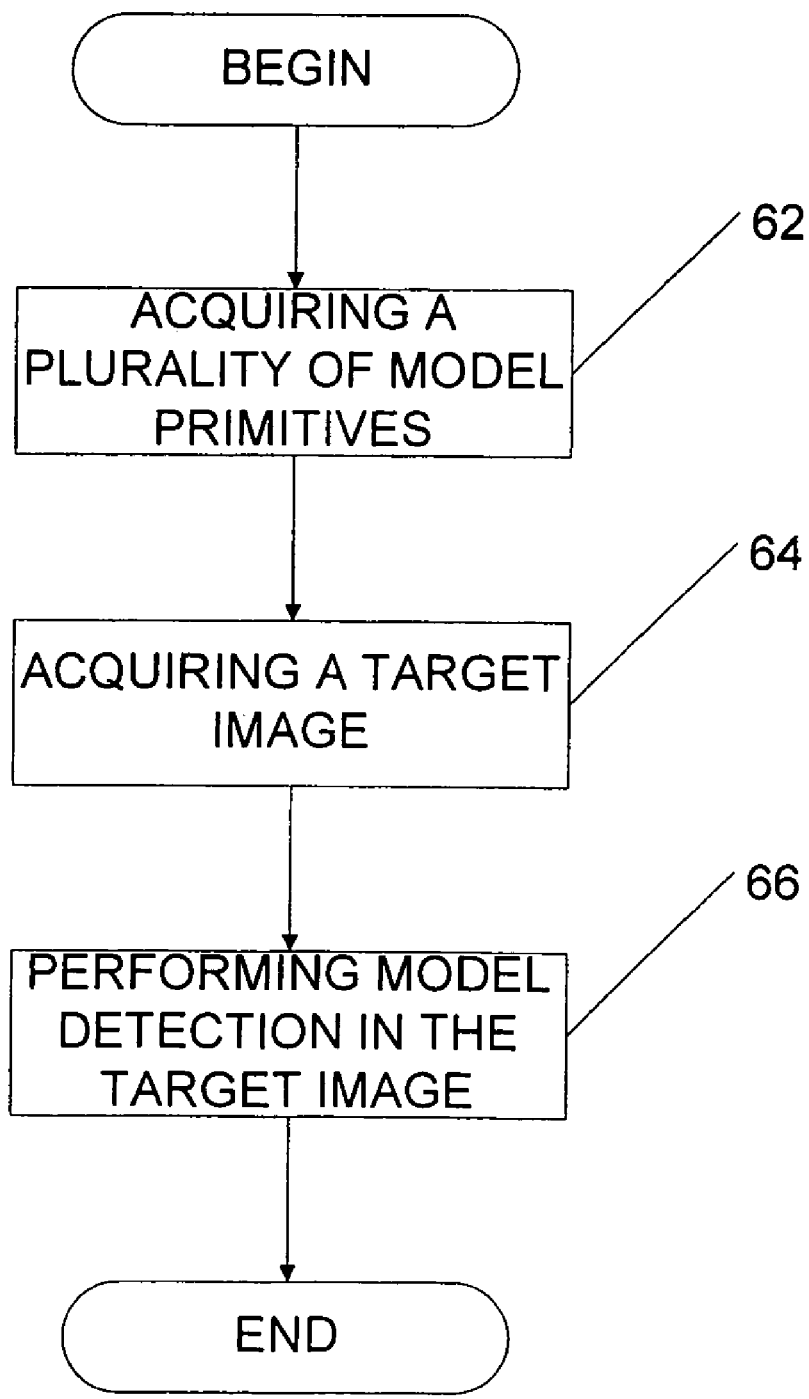
FIG. 4 is a flowchart of a method for pattern matching in accordance with a preferred embodiment of the invention.

Now referring to FIG. 4, there is shown the principal steps of the pattern recognition process in accordance with a preferred embodiment of the invention. According to step 62, a plurality of model primitives is acquired to define the model. Examples of primitives include straight line segments, curve line segments, points, and edge elements, commonly known as edgels. The plurality of model primitives comprises at least one additive primitive and at least one subtractive primitive. In a preferred embodiment, the plurality of model primitives comprises a plurality of additive primitives and a plurality of subtractive primitives. Examples of how the additive and subtractive primitives are used are discussed below. In an embodiment of the invention, additive and subtractive primitives are stored in memory (not shown).

In a preferred embodiment, the subtractive primitives are determined based on the expected false matches for a given application (e.g. by the user).

According to step 64, a target image is acquired by an image acquisition device (e.g. gray scale digital camera, electromagnetic or ultra-sonic imaging system, etc.).

According to step 66, an occurrence of the model is detected in the acquired target image using the additive and subtractive model primitives.

Figure 5:
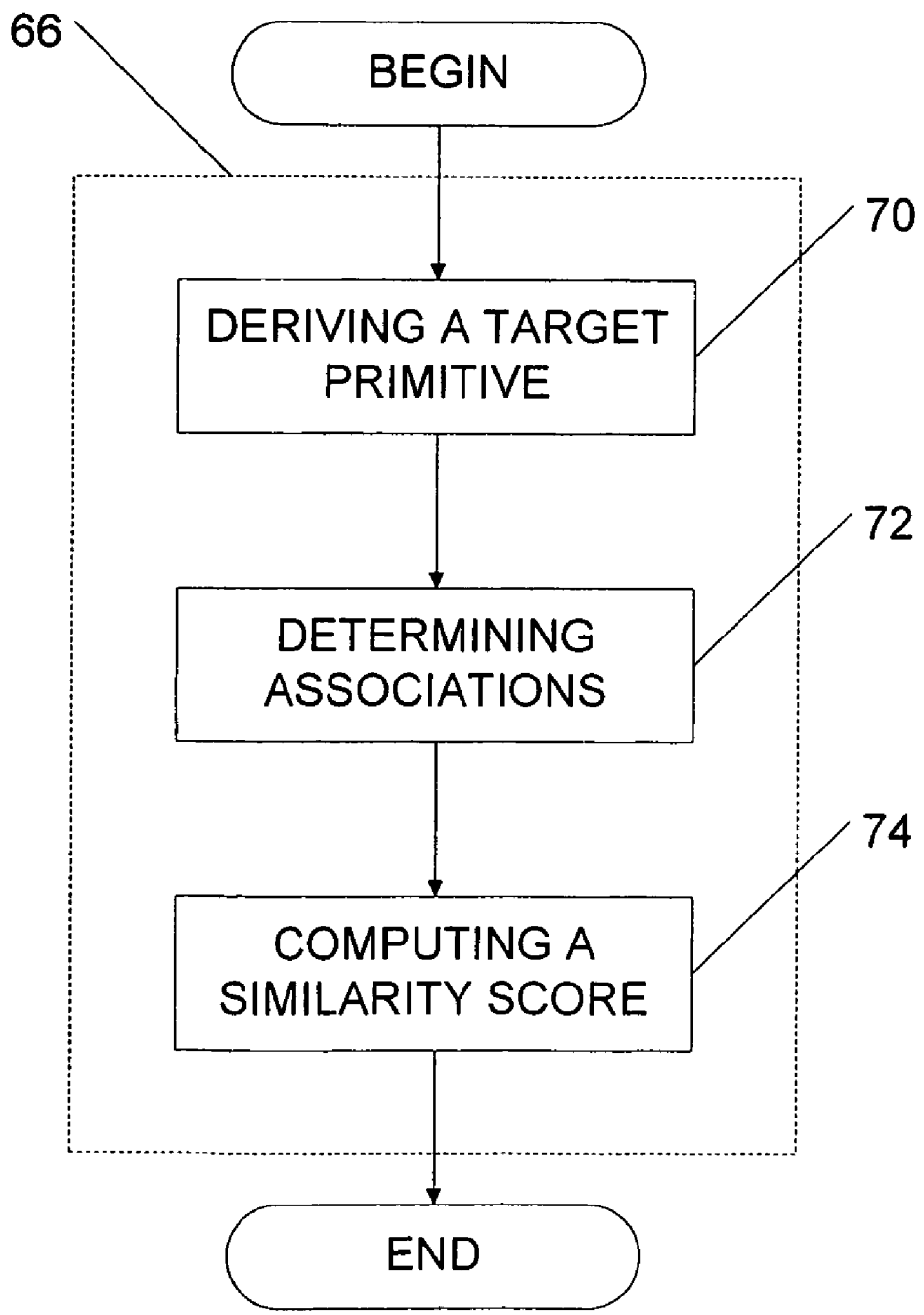
FIG. 5 is a flowchart showing in more detail the detection step of FIG. 4.

Now referring to FIG. 5, there is shown in more detail how the detection step 66 is performed. According to step 70, at least one target primitive is derived from the target image; the target primitives are derived according to methods known in the art. In a preferred embodiment, a plurality of target primitives are derived from the target image. According to step 72, associations between the derived target primitive (in a preferred embodiment, the target primitives) and the additive and subtractive model primitives are determined. According to step 74, a similarity score is computed using the previously determined associations.

In one embodiment of the invention, steps 70, 72 and 74 (and step 62 or FIG. 4) are performed according to a geometric hashing technique well known in the art, such as a typical geometric hashing method (as described in Y. C. Hecker and R. M. Bolle, On Geometric Hashing and the Generalized Hough Transform, IEEE Transactions on Systems, Man, and Cybernetics, Vol. 24, No. 9, September 1994, for example) or an improved geometric hashing method such as described in patent application Ser. No. 09/978,000 entitled "Geometric Hashing Method for Model-Based Recognition of an Object" and assigned to the assignee of the present invention. In an alternative embodiment of the invention, steps 70, 72 and 74 (and step 62 or FIG. 4) are performed according to a generalized Hough transform technique also well known in the art (as described in Y. C. Hecker and R. M. Bolle, On Geometric Hashing and the Generalized Hough Transform, IEEE Transactions on Systems, Man, and Cybernetics, Vol. 24, No. 9, September 1994, for example). In the geometric hashing embodiment, a hash table is used to store the model primitives. In the generalized Hough transform embodiment, an R-table is used to store the model primitives.

In yet another preferred embodiment, a position of the object in the target image is provided. In this embodiment, the additive model primitive and the subtractive model primitive comprise additive model edge elements and subtractive model edge elements respectively; also, the target primitive comprises target edge elements. In this embodiment, the association step 72 includes satisfying a neighboring condition between the target edge elements and either of the additive or subtractive model edge elements.

It will be appreciated that, in an embodiment of the invention, associations between target primitives and additive primitives contribute to increase the similarity score, while associations between target primitives and subtractive primitives contribute to decrease the similarity score.

Figure 6:
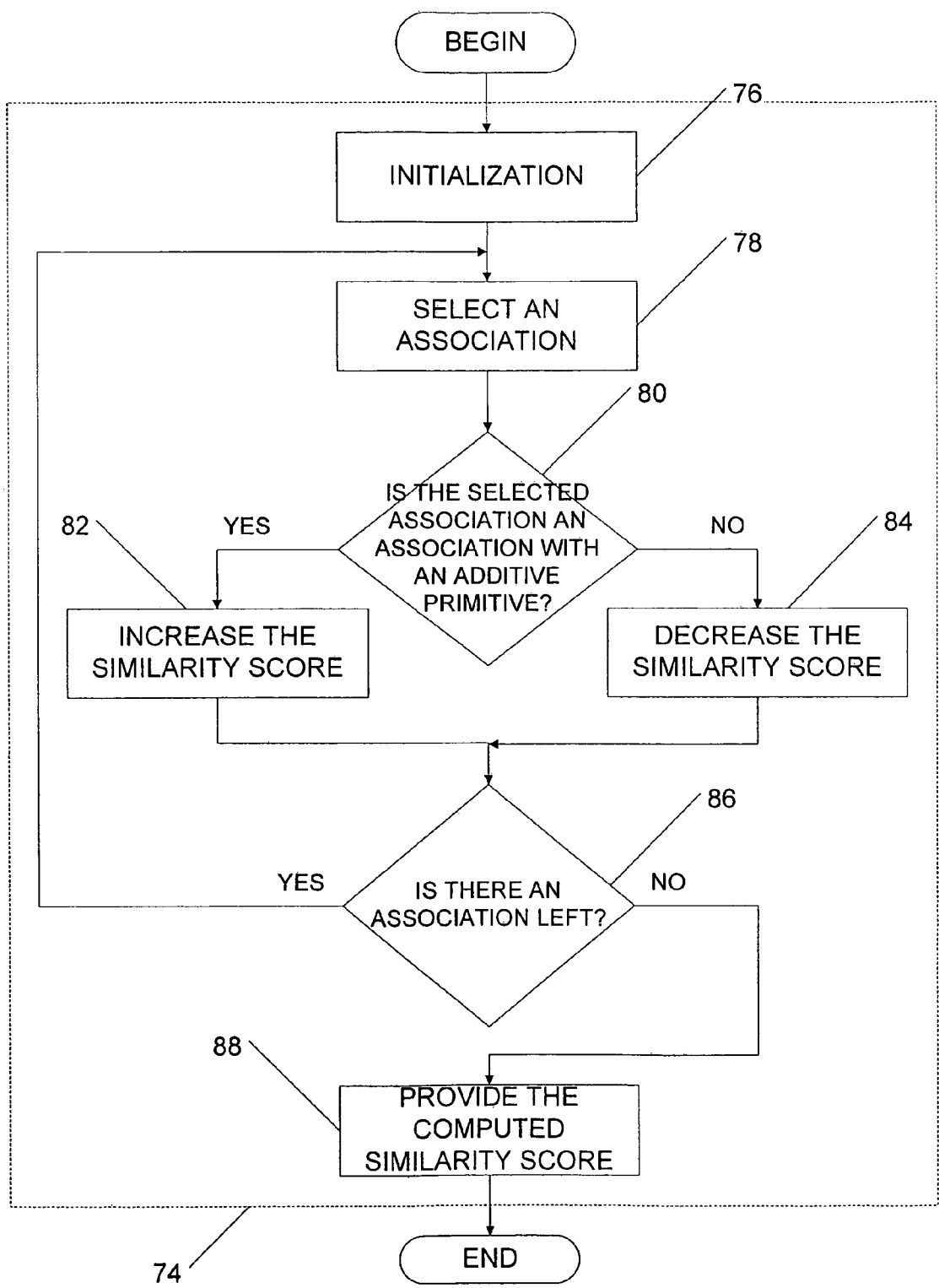
FIG. 6 is a flowchart showing in more detail the similarity score computation step of FIG. 5.

Now referring to FIG. 6, there is shown in more detail how the similarity score computation step 74 is performed.

According to step 76, an initialization of the similarity score is performed. According to step 78, one of the previously determined associations is selected. According to step 80, a check is performed to determine whether or not the selected association is an association of a target primitive with an additive primitive. If so, the similarity score is increased (step 82). If not, the similarity score is decreased (step 84).

In a preferred embodiment of the invention the similarity score is computed as follows:

$$\text{Similarity\_score} = \frac{\sum E_{PositiveAssociated} - \sum E_{NegativeAssociated}}{N_{Positive}},$$

where $E_{PositiveAssociated}$ is an association with an additive primitive, $E_{NegativeAssociated}$ is an association with a subtractive primitive, and $N_{Positive}$ is the total number of additive primitives.

The score may also be expressed in this fashion:

$$\text{Similarity\_score} = \frac{N_{AdditiveAssociated} - E_{SubtractiveAssociated}}{N_{Additive}},$$

where $N_{AdditiveAssociated}$ is the number of associations between a target primitive and an additive model primitive, $N_{SubtractiveAssociated}$ is the number of associations between a target primitive and a subtractive model primitive, and $N_{Additive}$ is the total number of additive model primitives.

Also, it will be appreciated that weights may be assigned to the model primitives (additive or subtractive) when computing the similarity score. As skilled addressees will understand, the addition of weights to model primitives affects (positively or negatively) the similarity score by putting emphasis on more important features of a model.

In a preferred embodiment of the invention employing weights, the similarity score is computed as follows:

$$\text{Similarity\_score} = \frac{\sum_{AdditiveAssociated} w_i - \sum_{SubtractiveAssociated} w_i}{\sum_{Additive} w_i},$$

where $$\sum_{AdditiveAssociated} w_i$$

is the sum of the weights of all additive model primitives that have been associated with a target primitive, $$\sum_{SubtracitiveAssociated} w_i$$

is the sum of the weights of all subtractive model primitives that have been associated with a target primitive, and $$\sum_{Additive} w_i$$

is the sum of the weights of all additive model primitives.

Someone skilled in the art will appreciate that the similarity score may be computed according to various other formulas.

According to step 86, a check is performed to determine if all associations have been considered in the calculation of the score. If there is an association left, the process returns to step 78 and selects an association that has not yet been considered. If there are no associations left, the computed similarity score is provided (step 88) and the process ends.

As described previously, steps 70, 72 and 74 are preferably performed according to a geometric hashing technique or a generalized Hough transform technique, both well known in the art. Both the geometric hashing and generalized Hough transform techniques detect occurrences of a model in a target image using a "voting" process. More specifically, an association between a target primitive and a model primitive results in the incrementing of a counter (vote accumulator) for a reference parameter indicative of a geometric transformation between the model primitives and the target primitives.

A person skilled in the art will appreciate that computing a similarity score (at step 74—by increasing the similarity score for each association between a target primitive and an additive primitive and by decreasing the similarity score for each association between a target primitive and a subtractive primitive—can be performed, according to a geometric hashing or a generalized Hough transform technique, by incrementing a counter for a reference parameter for each association between a target primitive and an additive primitive and decrementing a counter for a reference parameter for each association between a target primitive and a subtractive primitive.

A person skilled in the art will also appreciate that increasing or decreasing the similarity score by an amount determined by the weight assigned to the model primitive can be performed, according to a geometric hashing or a generalized Hough transform technique, by incrementing or decrementing a counter for a reference parameter by an amount determined by the weight assigned to the model primitive.

In the geometric hashing method described in the aforementioned patent application Ser. No. 09/978,000, for each association between a target primitive and a model primitive, a figure of merit indicative of a degree of correspondence between the target primitive and the model primitive is calculated, and an accumulator (for a reference parameter) is increased by an amount determined by the calculated figure of merit.

A person skilled in the art will appreciate that determining a similarity score according to the present invention can be performed, according to the geometric hashing method of the aforementioned application, by increasing or decreasing the accumulator by an amount determined by the figure of merit. In the case of weighted primitives, the figure of merit can be multiplied by a weighting factor prior to adding it to or subtracting it from the accumulator.

In a particular embodiment described in the aforementioned application, the target and model primitives are line segments, and the figure of merit is the length of the orthogonal projection onto the model primitive of the portion of the target primitive lying within an error corridor about the model primitive. This projection length is added to an accumulator for storing the total length of the orthogonal projections of the target primitives onto the model primitives (for a reference parameter). A similarity score is further determined as the ratio of the sum of orthogonal projections to the sum of the lengths of the model primitives.

A person skilled in the art will appreciate that determining a similarity score according to the present invention can be performed, according to the embodiment just described, by adding the projection length for each association between a target primitive and an additive primitive, and subtracting the projection length for each association between a target primitive and a subtractive primitive. In the case of weighted primitives, the projection length can be multiplied by a weighting factor prior to adding it to or subtracting it from the accumulator.

Figure 7:
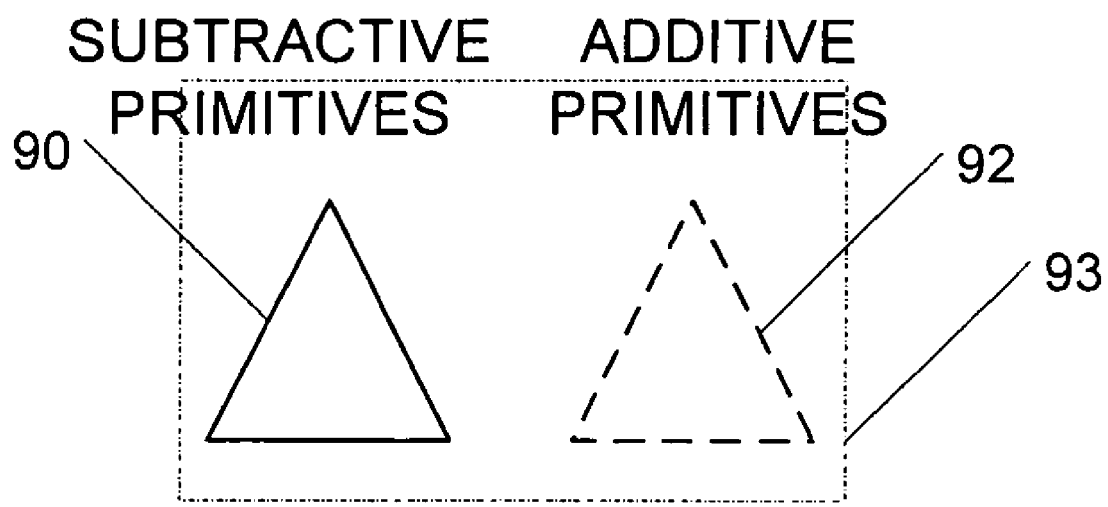
FIG. 7 is a schematic showing an example of a model comprising additive primitives and subtractive primitives in accordance with an embodiment of the invention.

FIGS. 7 and 8 together illustrate an example of pattern matching in accordance with an embodiment of the invention.

FIG. 7 illustrates the model to be found in the target image; the model comprises additive primitives 92 and subtractive primitives 90. The dotted lines 93 are defined for illustrative purposes only in order to easily reference the location of an occurrence of the model in the target image.

Figure 8A:
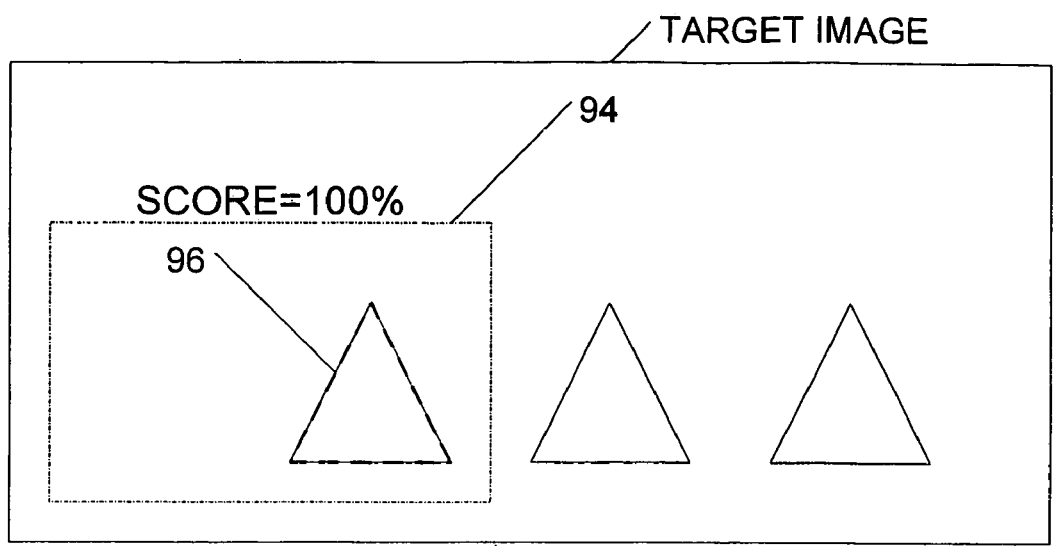
FIGS. 8a, 8b, and 8c are schematics showing an example where the additive and subtractive primitives are used in pattern matching in accordance with an embodiment of the method of the present invention.
Figure 8B:
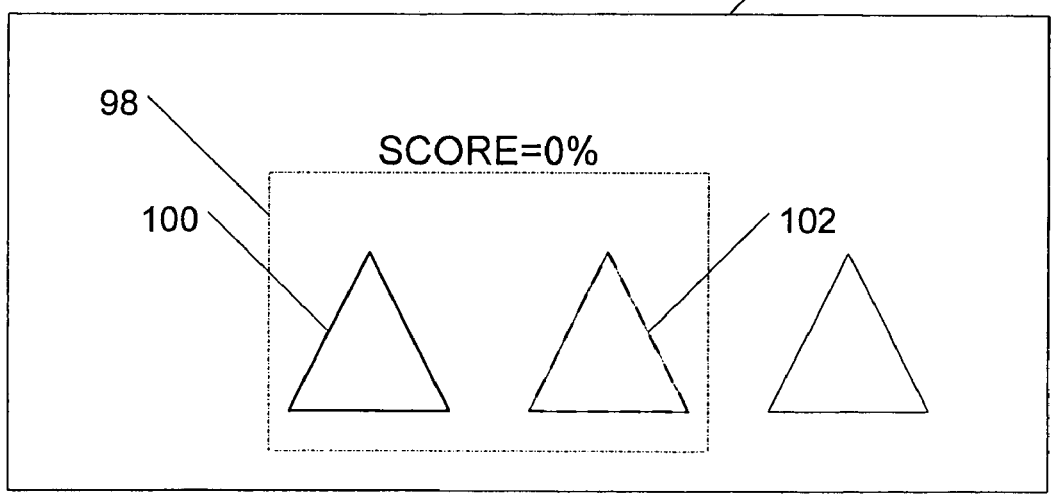
Figure 8C:
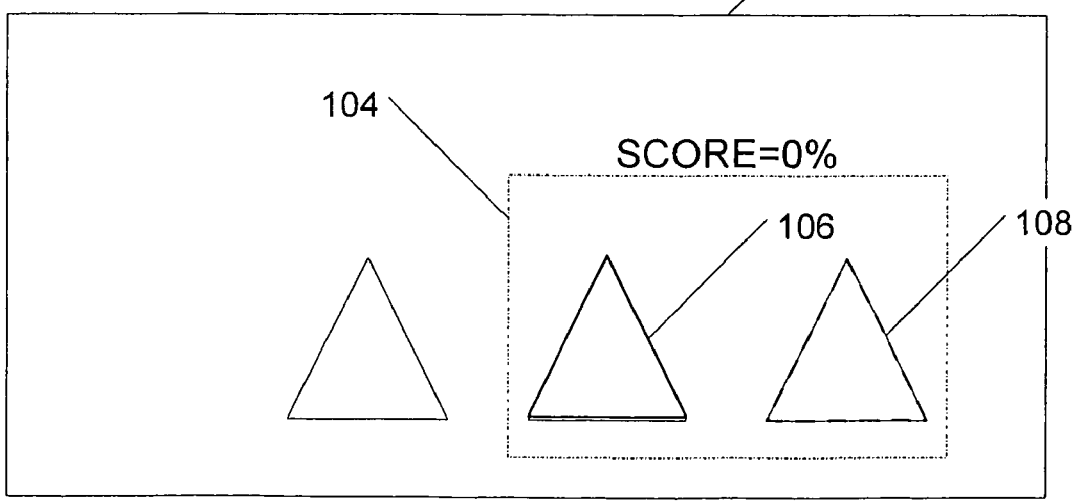

FIGS. 8*a*, 8*b*, and 8*c* show three occurrences of the model in a target image (at locations 94, 98, and 104) and their associated similarity scores.

Referring to FIG. 8*a*, at location 94, all of the additive model primitives 92 are associated with target primitives 96; these associations contribute positively to the similarity score. No associations are made with the subtractive model primitives 90. The resulting similarity score is 100%.

Referring to FIG. 8*b*, at location 98, the target primitives 102 are associated with the additive model primitives 92; these associations contribute positively to the similarity score. However, the target primitives 100 are associated with the subtractive model primitives 90; these associations contribute negatively to the score. In the illustrated situation, if the additive and subtractive model primitives have equal weights, the resulting score is 0%.

Referring to FIG. 8*c*, at location 104, the situation is analogous to the situation at location 98, and therefore the similarity score is 0%.

The skilled addressee will therefore appreciate that it is now possible to advantageously discriminate between objects in a target image that match the same additive primitives. The skilled addressee will also appreciate that the sought object in a target image could be incomplete to a certain degree (e.g. due to occlusion, degradation, etc.), and the method of the present invention would still find the correct match.

Figure 9:
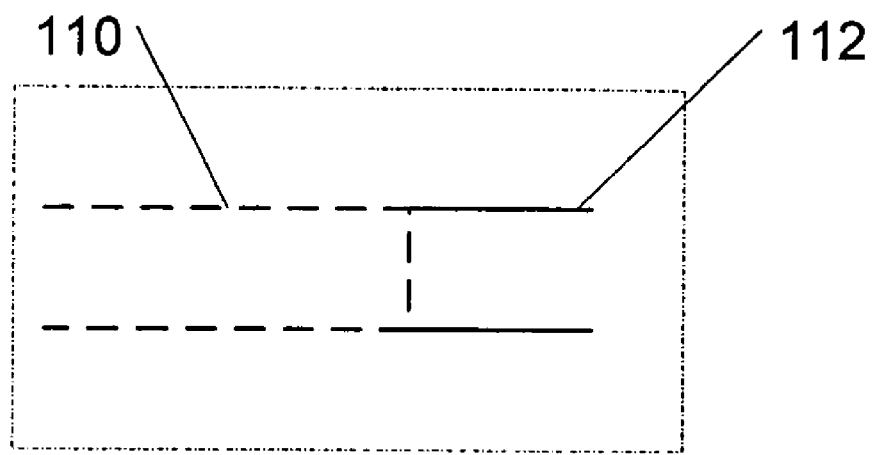
FIG. 9 is a schematic showing another example of a model comprising additive primitives and subtractive primitives in accordance with an embodiment of the invention.

FIGS. 9 and 10 together illustrate another example of pattern matching in accordance with an embodiment of the invention.

FIG. 9 illustrates the new model to be found in the target image; the model comprises additive primitives 110 and subtractive primitives 112.

Figure 10A:
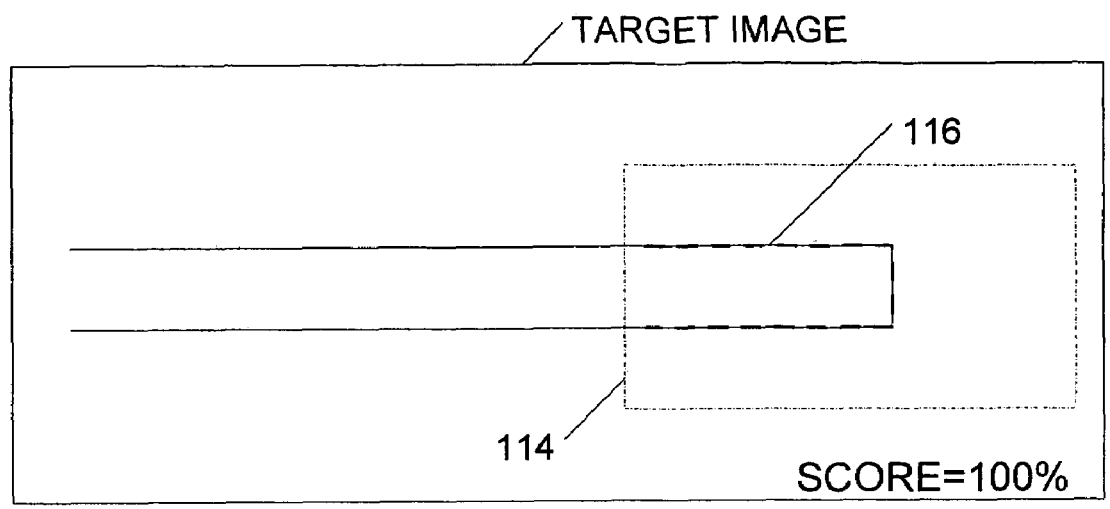
FIGS. 10*a*, 10*b*, and 10*c* are schematics showing another example where the additive and subtractive primitives are used in pattern matching in accordance with an embodiment of the present invention.
Figure 10B:
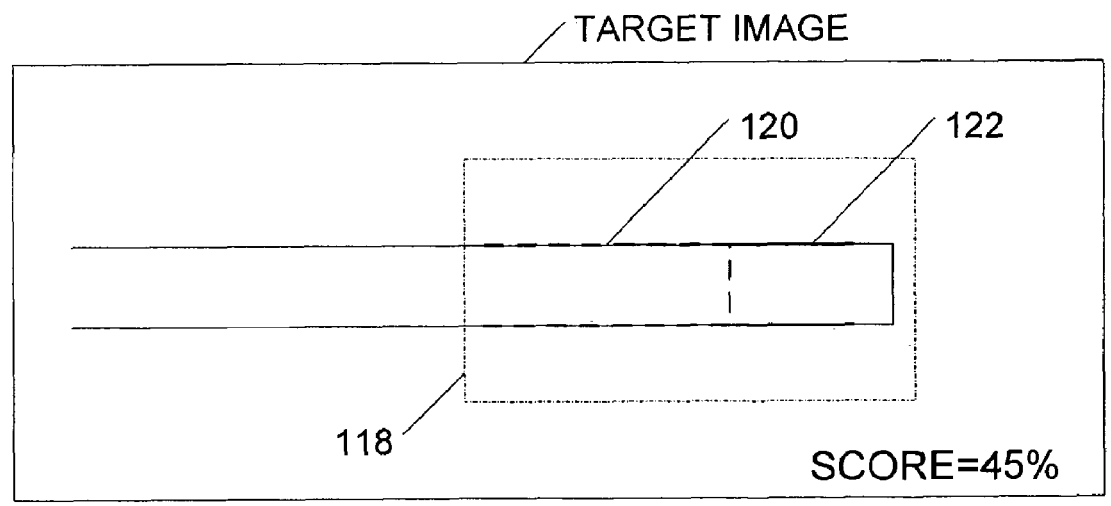
Figure 10C:
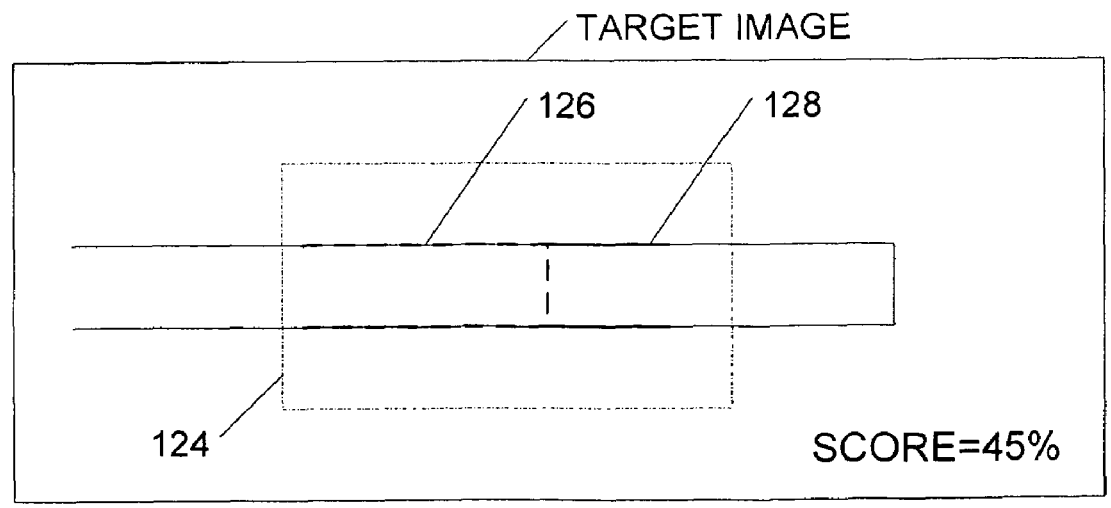

FIGS. 10*a*, 10*b*, and 10*c* show three occurrences of the model in a target image (at locations 114, 118, and 124) and their associated similarity scores.

Referring to FIG. 10*a*, at location 114, all the additive model primitives 110 are associated with target primitives 116. The corresponding similarity score is 100%, for example.

Referring to FIG. 10*b*, at location 118, all the additive model primitives 110 except for those belonging to the vertical edge of the model are associated with target primitives 120. However, the subtractive model primitives 112 are also associated to target primitives 122. The corresponding similarity score is 45%, for example.

Referring to FIG. 10*c*, at location 124, the situation is analogous to the situation at location 118, and therefore the similarity score is 45%.

The skilled addressee will therefore appreciate that it is possible to advantageously discriminate between the occurrences of an object in a target image as shown in FIGS. 10*a*, 10*b* and 10*c*. In this example, if the threshold for a positive match were selected at 70%, the method of the present invention would select only occurrence 116 as a match.

Although the main object of the invention is to determine the similarity score, it will be appreciated that this score may be compared to a threshold criteria; the result of the comparison indicates whether the pattern matching is conclusive. More precisely, if the similarity score is higher or equal to the threshold criteria, the pattern matching is conclusive; if the similarity score is below the threshold criteria, the pattern matching is not conclusive. The skilled addressee will appreciate that the threshold criteria depends on each specific application. The threshold criteria may be selected from a group comprising of a user-given criteria, a computer-generated criteria, a range of values, another similarity score, etc.

The present invention can be used in a variety of object recognition applications. Object recognition (or, equivalently, pattern matching) applications can be divided into two broad categories: 1) "classification" applications, in which an isolated target object contained in an image is recognized (classified) as one in a set of predefined model objects, and 2) "localization" applications, in which one or more occurrences of a model object are located in a target image.

Classification

Classification consists of recognizing an unknown object (target object) contained in an image as one in a bank of predefined model objects. Typically, this is achieved by determining a similarity score between the target object and each of the model objects, in turn, and then selecting the model object corresponding to the best score as a match for the target object.

In classical methods of object recognition that represent an object by a set of primitives, the similarity score between a target object and a model object represents the proportion of model primitives that match target primitives. The presence of extra target primitives that are not matched to model primitives does not affect the similarity score. In particular, when determining the similarity score for one model object, the presence of target primitives associated with another model object leaves the score unchanged. This is a significant problem when two or more model objects have a large portion of primitives in common, as illustrated in the example of FIG. 11A.

Figure 11:
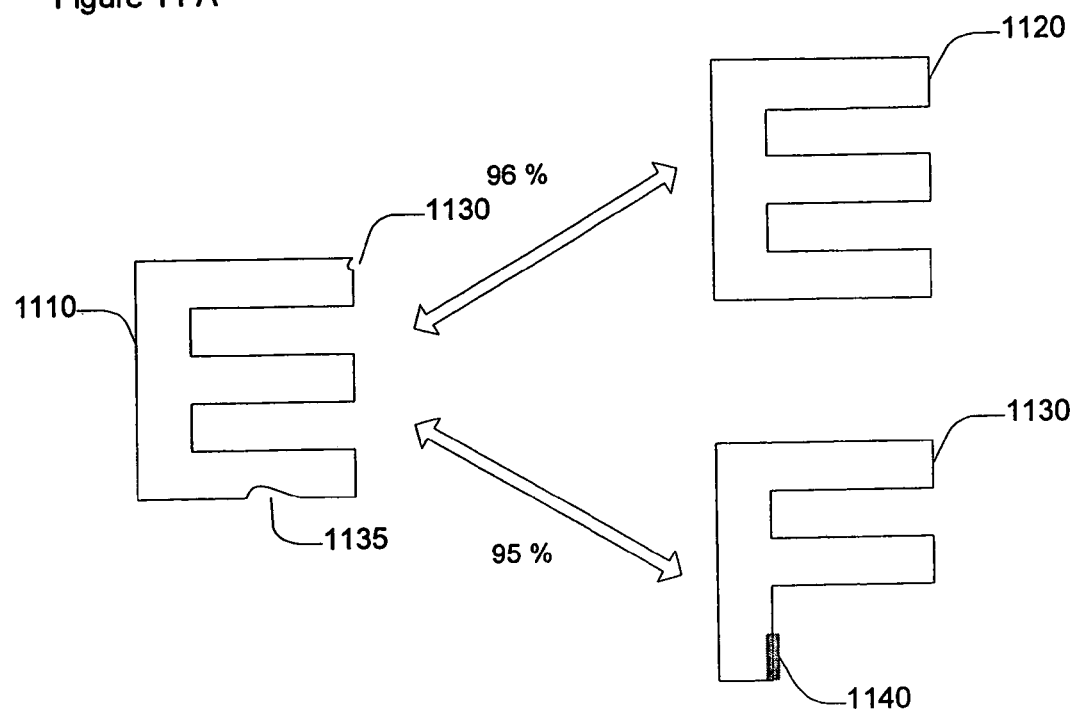
FIGS. 11*a*, 11*b*, 11*c*, and 11*d* are schematics showing the use of additive and subtractive primitives in the context of optical character recognition in accordance with an embodiment of the present invention.

The example of FIG. 11 relates to Optical Character Recognition (OCR), a particular type of object recognition. Referring to FIG. 11A, a similarity score is determined between a target character (here, character 'E') and each model character in a bank of model characters (here, only model characters 'E' and 'F' are shown). The target character is represented by target primitives 1110. The model characters 'E' and 'F' are represented by model primitives 1120 and 1130, respectively.

For model character 'E', essentially all the model primitives 1120 are matched to target primitives 1110, resulting in a similarity score of 96%, for example. The 4% unmatched model primitives are due to deformations of the contour of the target character at 1130 and 1135.

For model character 'F', excepting the subset 1140, essentially all the model primitives 1130 are matched to target primitives 1110, resulting in a similarity score of 95%, for example. (Note that the deformation of the contour at 1135 does not reduce the similarity score for character 'F', since the corresponding model primitives do not exist in the model character 'F'.)

The similarity scores for 'E' and 'F' are too close to select either of the characters as a match for the target character with an acceptable level of certainty. Furthermore, any additional deformation of the contour of the target character may cause the similarity score for 'F' to exceed that of 'E'.

Figure 11B:
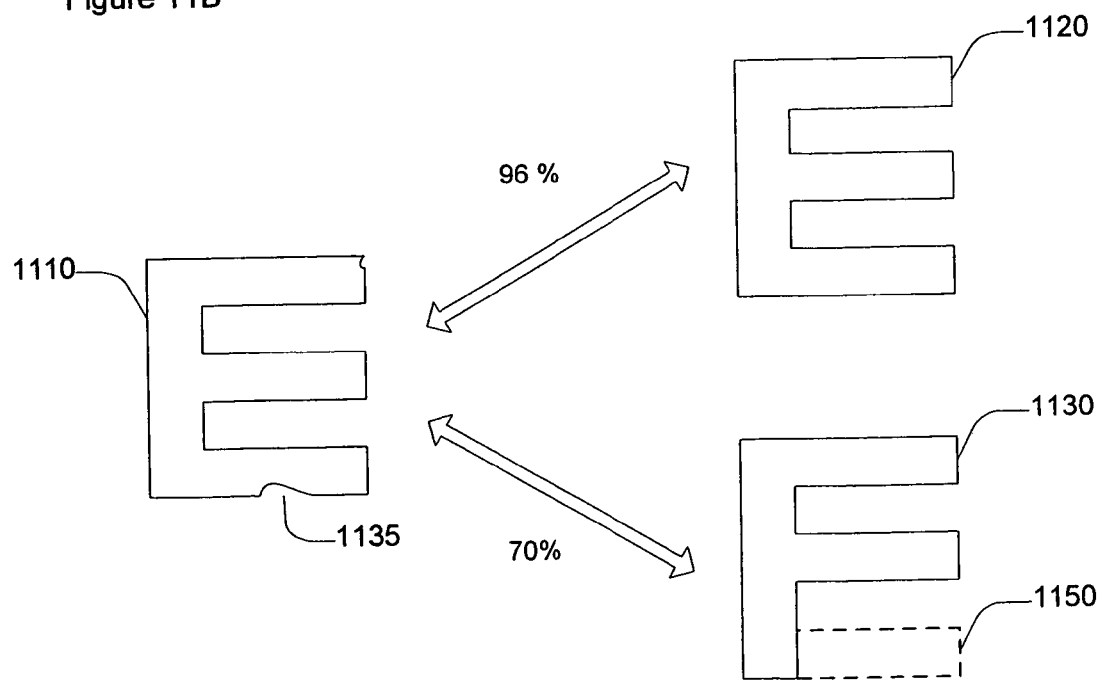
Figure 11C:
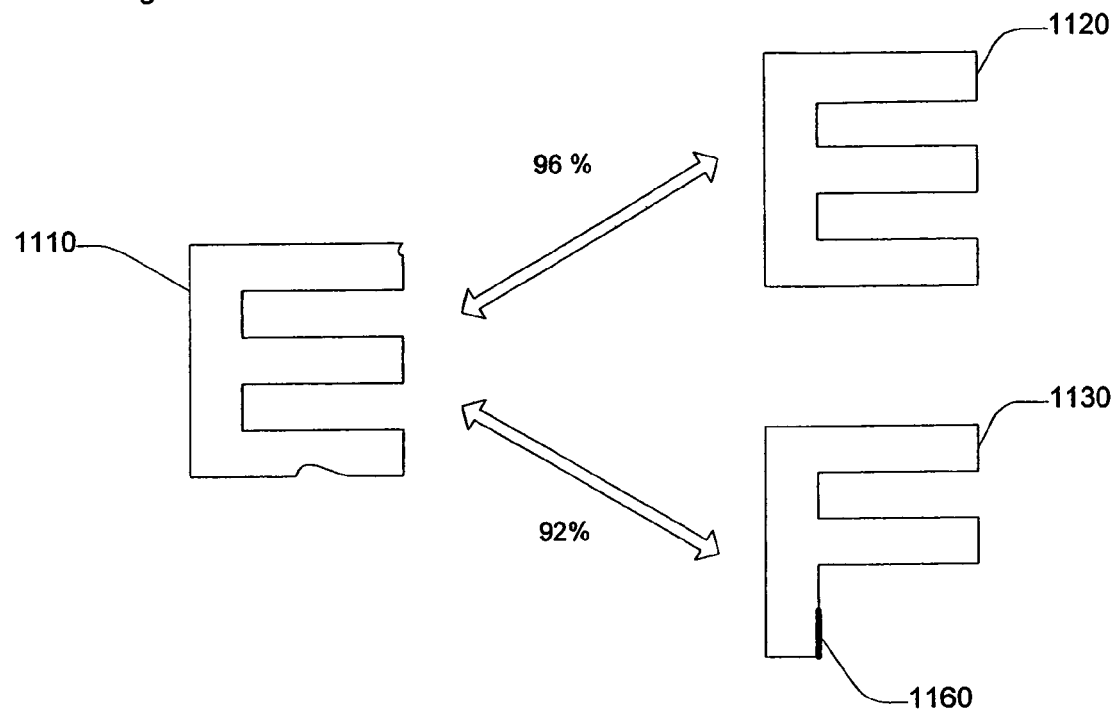
Figure 11D:
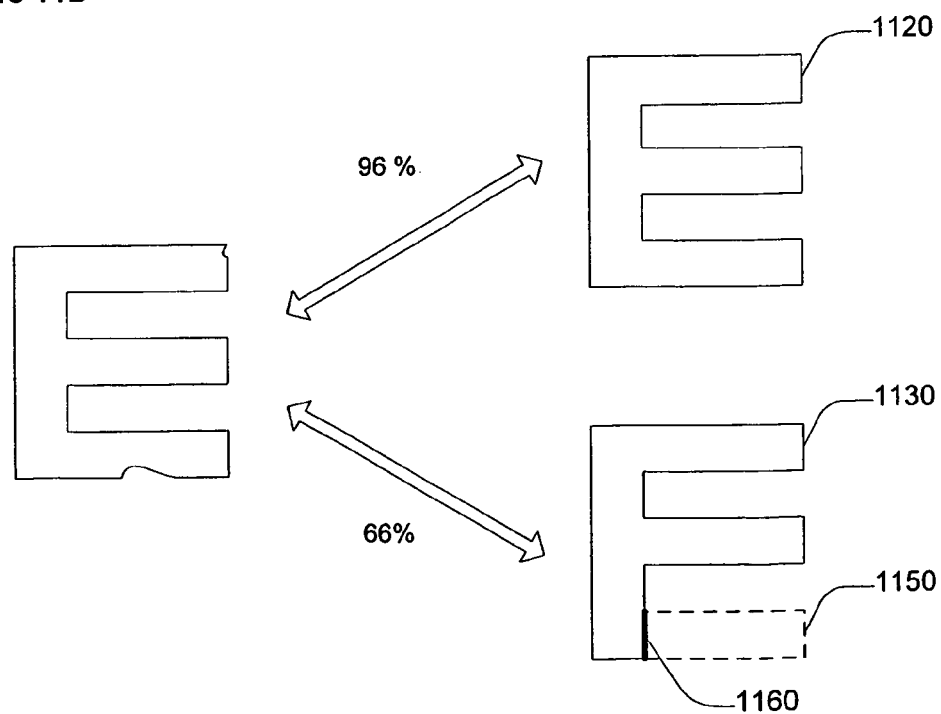

As illustrated in FIGS. 11B-D, the present invention overcomes the drawbacks of the prior art.

Referring to FIG. 11B, the model character 'F' is represented by additive primitives 1130 and subtractive primitives 1150. The subtractive primitives of model character 'F' represent the additive model primitives that are present in model character 'E' and that are absent in model character 'F'. In FIG. 11B, all of the subtractive primitives 1150

(except those associated with target primitives at 1135) are matched to target primitives, reducing the previous similarity score of 95% to 70%, for example. Thus, using the present invention, the target character is correctly matched to the model character 'E'.

The same concept can be applied to differentiate other model character pairs in OCR applications (e.g., O and Q, C and G, etc.) and to differentiate model object pairs in other object recognition applications (e.g., automated manufacturing).

Generally, in object recognition applications, the subtractive primitives of a model object represent the extra model primitives present in another model object that are absent in the model object of interest. Note that the subtractive primitives of a model object may represent extra model primitives corresponding to several other model objects.

Referring now to FIG. 11C, the model character 'F' is represented by model primitives having assigned weights. The model primitives 1160 are the only model primitives of model character 'F' that are absent in model character 'E', so these primitives are assigned a weight twice that of the remaining model primitives. As a result, the similarity score of 95% is reduced to 92%, for example, widening the gap between the similarity scores for 'E' and 'F'.

Generally, in object recognition applications, greater weights are assigned to model primitives that differentiate the model object from other model objects.

Referring now to FIG. 11D, the model character 'F' is represented by additive primitives 1130 and subtractive primitives 1150 and, in addition, a subset 1160 of the additive primitives is assigned a weight twice that of the remaining primitives. As a result, the similarity score is 66%. Note that the subtractive primitives can also be weighted.

Localization

Localization consists of locating one or more occurrences of a model object in a target image.

The present invention can be used to differentiate an occurrence of a model object from an occurrence of another similar object (i.e. which is the same as the model object, except for the presence of additional primitives).

This example is analogous to that described in FIG. 11A-D, except that in this case occurrences of a model character 'F' are being located in a target image also containing occurrences of character 'E'.

In some object recognition applications, a model object occurs in a target image as an element of a pattern of identical objects, but a "particular" occurrence is sought. A particular occurrence may be an occurrence of the model object in a specific configuration with respect to other objects of the pattern, such as on the boundary of the pattern, for example.

As described above, FIGS. 7 and 8 illustrate an example in which the present invention is used to locate a particular occurrence of a model object in a repetitive pattern of objects.

Many object recognition applications require an accurate measure of the "pose" (position, orientation, and scale) of an occurrence of a model object in a target image. In some cases, symmetry or repetitive features in a model object result in ambiguity regarding its location in an image. The present invention can remove this ambiguity, enabling a more efficient and precise localization process.

As described above, FIGS. 9 and 10 illustrate an example in which the present invention is used to solve ambiguity regarding the coordinates of a model object in a target image.

Figure 12A:
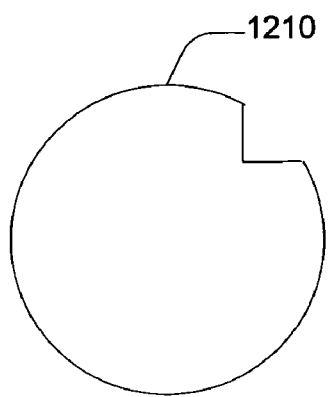
FIGS. 12*a* and 12*b* are schematics showing the use of additive and subtractive primitives in the context of an orientation ambiguity in accordance with an embodiment of the present invention.
Figure 12B:
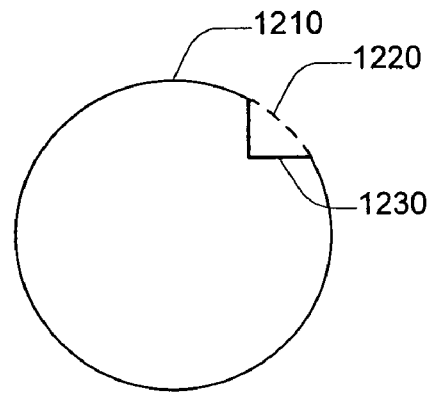

FIG. 12 illustrates an example in which the present invention is used to solve ambiguity regarding the orientation (e.g., angle with respect to a reference axis) of a model object in a target image. Referring to FIG. 12A, the model object defined by model primitives 1210 is rotationally symmetric except for a small triangular indention. As a result, when locating occurrences of the model object in a target image, several occurrences are returned having the same position and scale but having different orientations. In the presence of noise or occlusion, the similarity scores between the different occurrences might be too close to obtain a conclusive result. Referring to FIG. 12B, subtractive primitives 1220 and weighted primitives 1230 can be added to the model object to differentiate the correct occurrence of the model object from the other occurrences. Note that the subtractive primitives can also be weighted.

Figure 13A:
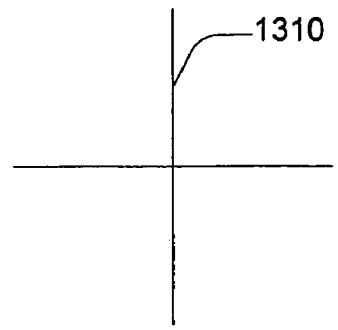
FIGS. 13*a*, 13*b*, and 13*c* are schematics showing the use of additive and subtractive primitives in the context of a scale ambiguity in accordance with an embodiment of the present invention.
Figure 13B:
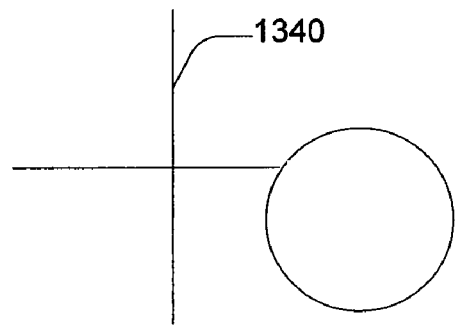
Figure 13C:
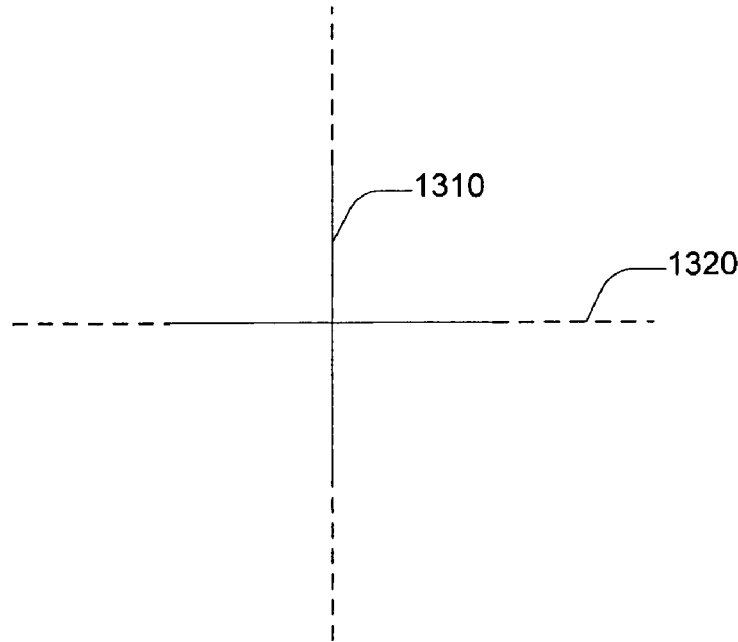

FIGS. 13A-C illustrate an example in which the present invention is used to solve ambiguity regarding the scale of a model object in a target image. FIG. 13A illustrates a model object defined by model primitives 1310 (represented at a scale of 1). FIG. 13B illustrates a set of target primitives 1340 representing the model object partially occluded by another object (also represented at a scale of 1). At a scale of 1, all of the model primitives 1310 are matched to target primitives 1340, except for those associated with target primitives absent due to occlusion. As a result, the similarity score is of 92%, for example. However, at scales of ⅔, ⅓ or ½, no model primitives are unmatched due to occlusion, resulting in a higher score of 100%, for example. Using prior art methods, several occurrences of the model object may be returned with incorrect scales. Referring to FIG. 13C, by adding subtractive primitives 1320 with an adequate weighting, only the occurrence with the correct scale is returned.

In practical applications, the use of additive and subtractive primitives having inverse weights (e.g., 1 and −1) is often insufficient to adequately discriminate against occurrences of the model object having additional unwanted primitives. To further discriminate against these occurrences, the magnitude of the weights of the subtractive primitives can be increased. In fact, in many applications, it appears beneficial to assign very large weights to the subtractive primitives; however, this can have adverse effects, as illustrated in FIGS. 14A-D.

Figure 14A:
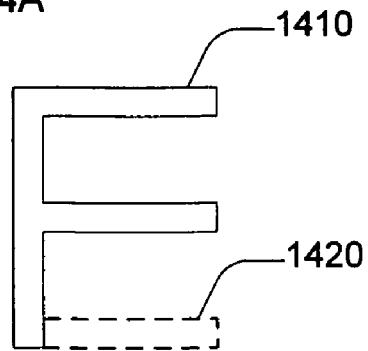
FIGS. 14*a*, 14*b*, 14*c*, and 14*d* are schematics showing an example of weighted additive and subtractive primitives in accordance with an embodiment of the present invention.
Figure 14B:
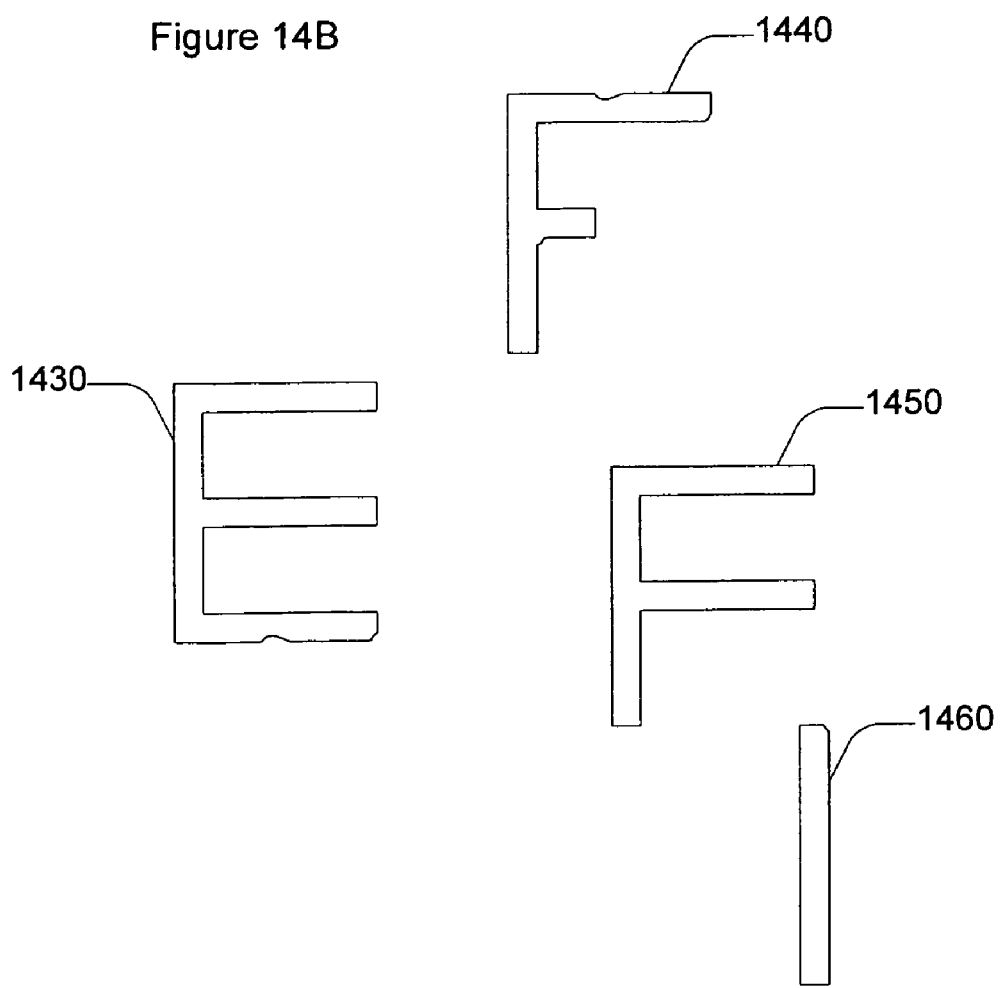

FIG. 14A illustrates a model object to be located in a target image; the model object is represented by additive primitives 1410 and subtractive primitives 1420. FIG. 14B illustrates a target image that has been processed to extract target primitives, including the set of target primitives 1430, 1440, 1450, and 1460.

Figure 14C:
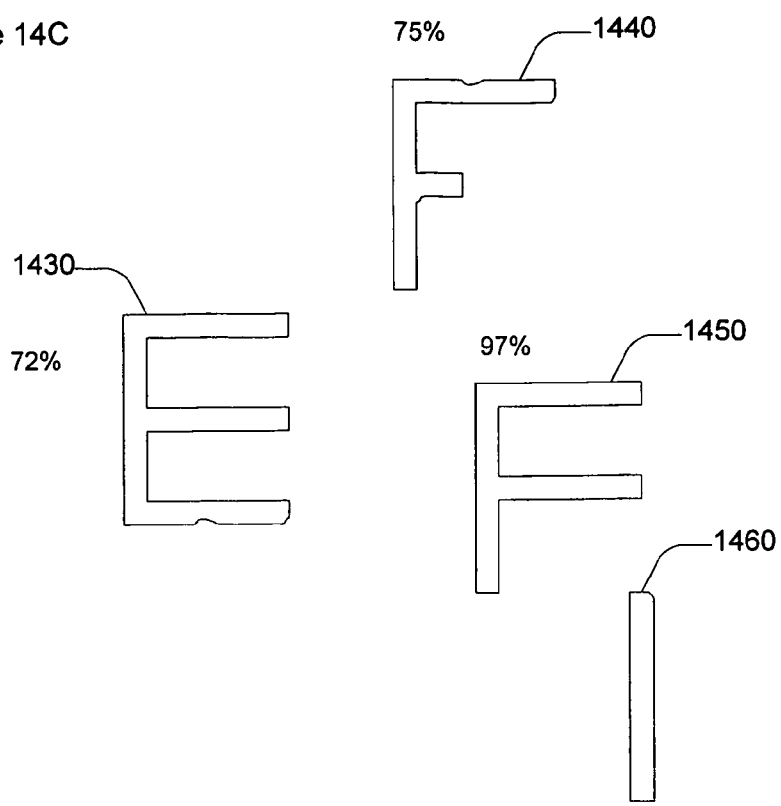

Referring to FIG. 14C, when the additive and subtractive primitives are assigned inverse weights (e.g. 1 and −1), three occurrences of the model object are detected in the target image with the similarity scores shown. At 1430, although essentially all the additive primitives are matched to target primitives, the matched subtractive primitives reduce the score to, for example, 72%. At 1440, due to font differences between the target character and the model character, a portion of the additive primitives are not matched to target primitives, resulting in a score of, for example, 75%. Finally, at 1450, an excellent exemplar score of 97% is achieved. Note that, due to the presence of noise and another object 1460, a very small portion of the subtractive primitives are matched to target primitives, slightly reducing the score. If the acceptance threshold were set to 70%, all three of these occurrences would be returned as matches for the model object, an unsatisfactory result.

In the case of font variations, which may be expected, the pattern matching scheme may be more tolerant of missing primitives, such as those missing from the lower horizontal 'stroke' of character 'F', and more severe regarding the presence of extra primitives, such as those characteristic of character 'E'. This problem may be addressed by significantly increasing the ratio of the weights of the subtractive primitives to those of the additive primitives.

Figure 14D:
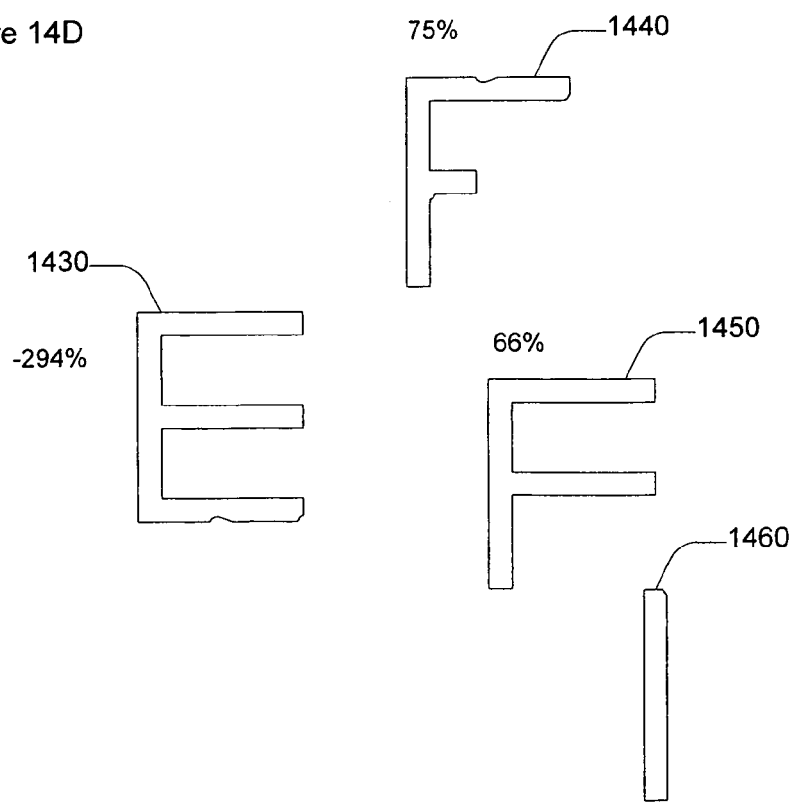

FIG. 14D shows the similarity scores obtained with a weight ratio of 15. As expected, the new weight ratio severely penalizes the target character 'E', whose similarity score becomes negative, while leaving the score of target character 'F' at 1440 unchanged. However, the score of target character 'F' at 1450 is adversely reduced to 66%; the previously negligible effect of the noise and the object 1460 on the score is amplified by the large weight assigned to the subtractive primitives. With an acceptance threshold of 70%, only the target character 1440 would be detected as a match for the model object; this result is also unsatisfactory.

Thus, an optimal application of the present invention requires selecting an appropriate set of subtractive primitives and an optimal set of weights for the specific situation at hand.

In a preferred embodiment, the method described above is stored on any state-of-the-art computer-readable storage medium (not shown) and executed by a processor. The foregoing storage medium and processor are meant to include, but are not limited to, a combination of a CPU with a memory device (external or internal, ROM, RAM, floppy disk, memory stick, hard drive, etc.), an Application Specific Integrated Circuit (ASIC), a Field Programmable Gate Array (FPGA), a circuit board, etc.

The embodiments of the invention described above are intended to be exemplary only. The scope of the invention is therefore intended to be limited solely by the scope of the appended claims.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for recognizing an object in a target image using model primitives comprising an additive primitive and a subtractive primitive, said method comprising:

assigning weights to said additive and subtractive primitives;

deriving a target primitive for said object;

determining associations between said target primitive and said model primitives; and computing a similarity score for said target primitive with respect to said model primitives, by increasing said similarity score for each one of said associations between said target primitive and said additive primitive, and by decreasing said similarity score for each one of said associations between said target primitive and said subtractive primitive, wherein said weights determine an amount by which said similarity score is increased or decreased for each of said associations, wherein the step of computing the similarity score comprises the steps of subtracting the sum of the weights of all subtractive primitives associated to a target primitive from the sum of the weights of all additive primitives associated to a target primitive and dividing the result by the sum of the weights of all additive primitives.

2. The method as claimed in claim 1, wherein said weights are predetermined.

3. The method as claimed in claim 1, wherein said determining associations comprises matching a neighboring condition between said target primitive and a model primitive of said model primitives.

4. The method as claimed in claim 1, further comprising comparing said similarity score to a threshold criteria to provide a result indicative of a pattern matching between said object and said model primitives.

5. The method as claimed in claim 4, wherein said threshold criteria is predetermined.

6. The method as claimed in claim 4, wherein said threshold criteria is generated from other similarity scores.

7. The method as claimed in claim 4, wherein said result indicative of a pattern matching is conclusive.

8. The method as claimed in claim 1, wherein said deriving, said determining and said computing are performed according to a geometric hashing technique, further wherein said determining associations is performed using a hash table comprising said model primitives.

9. The method of claim 1, wherein said deriving, said determining and said computing are performed according to a generalized Hough transform technique, further wherein said determining associations is performed using an R-table comprising said model primitives.

10. The method as claimed in claim 1, further comprising providing a position of said object within said target image, wherein said additive primitive comprises additive model edge elements, said subtractive primitive comprises subtractive model edge elements and said target primitive comprises target edge elements, further wherein said associating comprises satisfying a neighboring condition between said target edge elements and at least one of said additive model edge elements and said subtractive model edge elements.

11. The method as claimed in claim 1, further comprising, for each one of said associations between said target primitive and said model primitives, the steps of determining a figure of merit indicative of a degree of correspondence between the target primitive and the model primitive, and computing the similarity score using the determined figures of merit.

12. The method as claimed in claim 1, further comprising the step of using the similarity score to solve ambiguity regarding the scale of the object in the target image.

13. The method as claimed in claim 1, further comprising the step of using the similarity score to solve ambiguity regarding the orientation of the object in the target image.

14. A computer-readable storage medium for storing instructions for execution by a processing unit, said instructions for carrying out a method for recognizing an object in a target image using model primitives comprising an additive primitive and a subtractive primitive, said method comprising:

assigning weights to said additive and subtractive primitives;

deriving a target primitive for said object;

determining associations between said target primitive and said model primitives; and computing a similarity score for said target primitive with respect to said model primitives, by increasing said similarity score for each one of said associations between said target primitive and said additive primitive, and by decreasing said similarity score for each one of said associations between said target primitive and said subtractive primitive, wherein said weights determine an amount by which said similarity score is increased or decreased for each of said associations, wherein the step of computing the similarity score comprises the steps of subtracting the sum of the weights of all subtractive primitives associated to a target primitive from the sum of the weights of all additive primitives associated to a target primitive and dividing the result by the sum of the weights of all additive primitives.

15. The computer-readable storage medium as claimed in claim 14, wherein the weights are predetermined.

16. The computer-readable storage medium as claimed in claim 14, wherein said determining associations comprises matching a neighboring condition between said target primitive and a model primitive of said model primitives.

17. The computer-readable storage medium as claimed in claim 14, further comprising comparing said similarity score to a threshold criteria to provide a result indicative of a pattern matching between said object and said model primitives.

18. The storage medium as claimed in claim 17, wherein said threshold criteria is predetermined.

19. The storage medium as claimed in claim 17, wherein said threshold criteria is generated from other similarity scores.

20. The storage medium as claimed in claim 17, wherein said result indicative of a pattern matching is conclusive.

21. The computer-readable storage medium as claimed in claim 14, wherein said deriving, said determining and said computing are performed according to a geometric hashing technique, further wherein said determining associations is performed using a hash table comprising said model primitives.

22. The computer-readable storage medium of claim 14, wherein said deriving, said determining and said computing are performed according to a generalized Hough transform technique, further wherein said determining associations is performed using an R-table comprising said model primitives.

23. The computer-readable storage medium as claimed in claim 14, further comprising providing a position of said object within said target image, wherein said additive primitive comprises additive model edge elements, said subtractive primitive comprises subtractive model edge elements and said target primitive comprises target edge elements, further wherein said associating comprises satisfying a neighboring condition between said target edge elements and at least one of said additive model edge elements and said subtractive model edge elements.

24. The computer-readable storage medium as claimed in claim 14, further comprising, for each one of said associations between said target primitive and said model primitives, the steps of determining a figure of merit indicative of a degree of correspondence between the target primitive and the model primitive, and computing the similarity score using the determined figures of merit.

25. The computer-readable storage medium as claimed in claim 14, further comprising the step of using the similarity score to solve ambiguity regarding the scale of the object in the target image.

26. The computer-readable storage medium as claimed in claim 14, further comprising the step of using the similarity score to solve ambiguity regarding the orientation of the object in the target image.

\* \* \* \* \*